US012748480B2

(12) United States Patent
Lee et al.

(10) Patent No.: US 12,748,480 B2
(45) Date of Patent: Sep. 29, 2026

(54) DYNAMIC VOLTAGE AND FREQUENCY SCALING (DVFS) CONTROLLER, INTEGRATED CIRCUIT INCLUDING THE DVFS CONTROLLER, AND METHOD OF OPERATING THE DVFS CONTROLLER

(71) Applicant: Samsung Electronics Co., Ltd., Suwon-si (KR)

(72) Inventors: Kyungsoo Lee, Suwon-si (KR); Sooyong Kim, Suwon-si (KR); Younghoon Lee, Suwon-si (KR); Jongjin Lee, Suwon-si (KR); Junho Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 18/749,071

(22) Filed: Jun. 20, 2024

(65) Prior Publication Data

US 2024/0427405 A1 Dec. 26, 2024

(30) Foreign Application Priority Data

Jun. 22, 2023 (KR) ........................ 10-2023-0080680
Dec. 5, 2023 (KR) ........................ 10-2023-0174932

(51) Int. Cl.
*G06F 1/324* (2019.01)
*G05F 1/56* (2006.01)
*G06F 1/3296* (2019.01)

(52) U.S. Cl.
CPC .................................... *G06F 1/324* (2013.01)

(58) Field of Classification Search
CPC ...... G06F 1/324; G06F 1/3203; G06F 1/3296; G06F 1/56
See application file for complete search history.

(56) References Cited

U.S. PATENT DOCUMENTS 9,525,423 B1 * 12/2016 Lesea ............. G01R 31/318513
9,634,676 B2 4/2017 Swaminathan et al.
9,778,676 B2 10/2017 Pal et al.
9,798,376 B2 10/2017 Pal
10,289,141 B2 5/2019 Lin et al.
10,587,250 B2 3/2020 Hanke et al.
10,963,032 B2 3/2021 Kronmueller et al.
11,119,554 B2 9/2021 Ryu
11,531,794 B1 12/2022 Odabasi et al.
(Continued)

FOREIGN PATENT DOCUMENTS

KR 10-2049952 B1 11/2019

*Primary Examiner* — Jaweed A Abbaszadeh
*Assistant Examiner* — Gayathri Sampath
(74) *Attorney, Agent, or Firm* — Fish & Richardson P.C.

(57) ABSTRACT

A Dynamic Voltage and Frequency Scaling (DVFS) controller, an integrated circuit including DVFS, and a method of operating the DVFS controller are provided. The integrated circuit includes at least one subblock circuit configured to process an instruction, and a DVFS controller configured to control a power management unit (PMU) and a clock management unit (CMU) to control an operating voltage and an operating frequency, respectively, based on a resonance frequency calculated from a frequency response resulting from dynamic characteristics of an entire power system including the PMU, a power delivery network (PDN), and the subblock circuit.

20 Claims, 11 Drawing Sheets

(56) References Cited

U.S. PATENT DOCUMENTS

| | | | | |
|---|---|---|---|---|
| 2008/0103701 | A1* | 5/2008 | Xiao | G06N 3/126 706/6 |
| 2014/0068299 | A1* | 3/2014 | Koinuma | G06F 9/3836 713/322 |
| 2015/0234452 | A1* | 8/2015 | Heo | G06F 1/26 713/320 |
| 2017/0038789 | A1* | 2/2017 | Pal | G06F 1/08 |
| 2017/0110958 | A1* | 4/2017 | Wang | G06F 1/3296 |
| 2019/0339757 | A1* | 11/2019 | Roy | G06F 1/26 |
| 2021/0096635 | A1* | 4/2021 | Kalyanam | G06F 1/3237 |
| 2021/0311537 | A1 | 10/2021 | Srinivasan et al. | |

* cited by examiner

DYNAMIC VOLTAGE AND FREQUENCY SCALING (DVFS) CONTROLLER, INTEGRATED CIRCUIT INCLUDING THE DVFS CONTROLLER, AND METHOD OF OPERATING THE DVFS CONTROLLER

CROSS-REFERENCE TO RELATED APPLICATIONS

This application is based on and claims priority under 35 U.S.C. § 119 to Korean Patent Application No. 10-2023-0080680, filed on Jun. 22, 2023 in the Korean Intellectual Property Office, and Korean Patent Application No. 10-2023-0174932, filed on Dec. 5, 2023 in the Korean Intellectual Property Office, the disclosures of each of which are incorporated by reference herein in their entirety.

BACKGROUND

The inventive concepts relate to integrated circuits, and more particularly, to Dynamic Voltage and Frequency Scaling (DVFS) controllers, integrated circuits including DVFS, and methods of operating the DVFS controllers.

As computing systems, such as mobile devices, become miniaturized, power management becomes an important issue. In particular, as the number of cores increases to increase the performance of mobile devices and the number of IP devices included in mobile devices increases, the complexity of a power management function is increasing.

For example, an application processor of mobile devices can manage power by adjusting the frequency or voltage within the application processor through a Dynamic Frequency Scaling (DFS) operation of adjusting the frequency within the application processor or a Dynamic Voltage Scaling (DVS) operation of adjusting the voltage within the application processor. In addition, an application processor of mobile devices can manage power by adjusting the frequency or voltage within the application processor through a DVFS operation of adjusting the frequency and voltage within the application processor.

SUMMARY

Some example embodiments of the inventive concepts provide a Dynamic Voltage and Frequency Scaling (DVFS) controller that performs a DVFS operation to optimize performance compared to an operating voltage and implement a stable low-power operation even in voltage drooping, an integrated circuit including DVFS, and a method of operating the DVFS controller.

According to some example embodiments of the inventive concepts, there is provided an integrated circuit that may include at least one subblock circuit configured to process an instruction, and a DVFS controller configured to control a power management unit (PMU) and a clock management unit (CMU) to control an operating voltage and an operating frequency, respectively, based on a resonance frequency calculated from a frequency response resulting from dynamic characteristics of an entire power system including the PMU, a power delivery network (PDN), and the at least one subblock circuit.

According to some example embodiments of the inventive concepts, there is provided a method of operating a DVFS controller for controlling an operating voltage and an operating frequency of an integrated circuit, the method including receiving a resonance frequency calculated from a frequency response resulting from dynamic characteristics of an entire power system including a PMU, a PDN, and a subblock circuit, receiving a feedback signal corresponding to an output of the entire power system to which the operating voltage and the operating frequency are applied, and controlling the PMU and a CMU to update the operating voltage and the operating frequency, respectively, based on the resonance frequency and the feedback signal.

According to some example embodiments of the inventive concepts, there is provided a DVFS controller including a PMU driving circuit configured to output a voltage control signal to a PMU, and a CMU driving circuit configured to output a frequency control signal to a CMU, wherein the DVFS controller is configured to allow the PMU and the CMU to control an operating voltage and an operating frequency, respectively, based on a resonance frequency calculated from a frequency response resulting from dynamic characteristics of an entire power system including the PMU, a PDN, and a subblock circuit configured to process an instruction.

BRIEF DESCRIPTION OF THE DRAWINGS

Example embodiments will be more clearly understood from the following detailed description taken in conjunction with the accompanying drawings in which.

DETAILED DESCRIPTION

Figure 1:
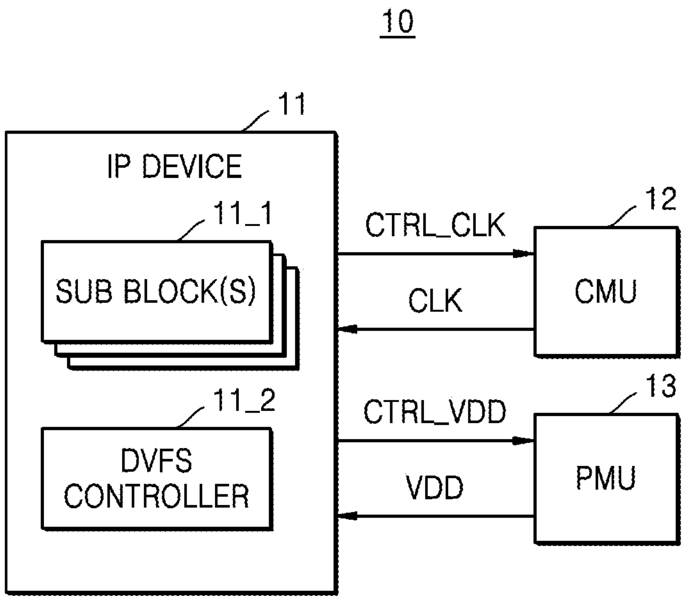
FIG. 1 is a block diagram of a system according to some example embodiments of the inventive concepts.

Some example embodiments will now be described more fully with reference to the accompanying drawings. The same reference numerals are used for the same components in the drawings, and redundant descriptions thereof are omitted.

Throughout the specification, when a part is "connected" to another part, it includes not only a case where the part is "directly connected" but also a case where the part is "indirectly connected" with another part in between. In addition, unless explicitly described to the contrary, the word "comprise" and variations such as "comprises" or "comprising" will be understood to imply the inclusion of stated elements but not the exclusion of any other elements.

It will be understood that when an element such as a layer, film, region, area, or substrate is referred to as being "on"

another element, it can be directly on the other element or intervening elements may also be present. In contrast, when an element is referred to as being "directly on" another element, there are no intervening elements present. Further, in the specification, an element that is "on" another element may be above, beneath, or horizontally next to (e.g., horizontally adjacent to) the other element and is not necessarily above an upper side of the other element based on a gravitational direction.

The use of the term "the" and similar demonstratives may correspond to both the singular and the plural. Operations constituting methods may be performed in any suitable order unless otherwise indicated herein or otherwise clearly contradicted by context and are not necessarily limited to the stated order.

The use of all illustrations or illustrative terms in some example embodiments is simply to describe the technical ideas in detail, and the scope of the present inventive concepts is not limited by the illustrations or illustrative terms unless they are limited by claims.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same. While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., +10%).

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., +10%) around the stated elements and/or properties thereof.

When the terms "about" or "substantially" are used in this specification in connection with a numerical value, it is intended that the associated numerical value includes a manufacturing or operational tolerance (e.g., +10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., +10%) around the stated numerical values or shapes. When ranges are specified, the range includes all values therebetween such as increments of 0.1%.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

FIG. 1 is a block diagram of a system 10 according to some example embodiments.

Referring to FIG. 1, the system 10 may include an intellectual property (IP) device 11, a clock management unit (CMU) 12, and a power management unit (PMU) 13. The system 10 may correspond to (e.g., may include) various types of data processing devices and, for example, may correspond to a mobile device. The system 10 may correspond to a laptop computer, a mobile telephone, a smartphone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile Internet device (MID), a wearable computer, an Internet of Things (IoT) device, an Internet of Everything (IoE) device, or an e-book.

The system 10 may include various types of memory devices. For example, a memory may correspond to various types of semiconductor memory devices. According to some example embodiments, the memory may be dynamic random access memory (DRAM) such as double data rate synchronous DRAM (DDR SDRAM), low power double data rate (LPDDR) SDRAM, graphic double data rate (GDDR) SDRAM, or Rambus DRAM (RDRAM). Additionally, the memory may be any one of flash memory, phase-change RAM (PRAM), magnetoresistive RAM (MRAM), resistive RAM (ReRAM), or ferroelectric RAM (FeRAM).

According to some example embodiments, the system 10 may be implemented by using a system on chip (SoC). The SoC may include a system bus to which a protocol having a certain bus standard has been applied, and components included in the system 10 may be connected to the system bus. For example, an Advanced Microcontroller Bus Architecture (AMBA) protocol by Advanced RISC Machine (ARM) may be applied as a standard of the system bus. Examples of bus types of the AMBA protocol may include an Advanced High-Performance Bus (AHB), an Advanced Peripheral Bus (APB), an Advanced extensible Interface (AXI), AXI4, and AXI Coherency Extensions (ACE). Besides them, other types of protocols, such as uNetwork by SONICs, CoreConnect by IBM, and an Open Core Protocol by OCP-IP, are applicable.

The IP device 11 may include a plurality of subblocks 11_1 (also referred to herein interchangeably as subblock circuits) and a Dynamic Voltage and Frequency Scaling (DVFS) controller 11_2. An IP device may be designed as an integrated circuit implemented with multiple transistors. The IP device 11 may be, for example, a central processing unit (CPU), a graphics processing unit (GPU), a neural processing unit (NPU), or an image signal processor (ISP). FIG. 1 shows one IP device 11, but the type and number (e.g., quantity) of IP devices included in the system 10 are not limited thereto. Although not shown in FIG. 1, the IP device 11 may additionally include a feedback block and a filter. According to some example embodiments, at least some of the feedback block, the filter, and the DVFS controller 11_2 may be located outside the IP device 11.

Each of the plurality of subblocks 11_1 may independently process instructions. The subblock may be a CPU core, a GPU core, an NPU core, or an ISP core. Because the IP device 11 includes multiple cores, the system 10 may also be referred to as a multi-core processor. The subblock may also be referred to as a sub function block.

Each of the plurality of subblocks 11_1 may process instructions according to a clock signal CLK and a power supply voltage VDD. The performance of the subblocks 11_1 may depend on the clock signal CLK and the power supply voltage VDD. As the magnitude of the power supply voltage VDD increases and the frequency of the clock signal CLK increases, the performance of the IP device 11 may improve and power consumption of the IP device 11 may increase. In this specification, the frequency of the clock signal CLK may be referred to as an operating frequency, and the magnitude of the power supply voltage VDD may be referred to as an operating voltage.

The DVFS controller 11_2 may determine respective operating statuses of various functional blocks in the system 10 and may provide, to the CMU 12 and/or the PMU 13, control signals CTRL_CLK and CTRL_VDD for adjusting the operating frequency and/or operating voltage of each of the functional blocks according to a result of the determination. For example, the DVFS controller 11_2 may adjust the operating frequency and the operating voltage both provided to the plurality of subblocks 11_1.

In detail, the DVFS controller 11_2 may output (e.g., transmit) the control signals CTRL_CLK and CTRL_VDD for controlling the operating conditions of the IP device 11 at particular (or, alternatively, predetermined) sample intervals. In detail, the DVFS controller 11_2 may output a clock control signal CTRL_CLK that controls the frequency of the clock signal CLK (e.g., controls the CMU 12 to adjust the frequency of the clock signal CLK) and may output a voltage control signal CTRL_VDD that controls the level (e.g., magnitude) of the power supply voltage VDD (e.g., controls the PMU 13 to adjust the magnitude of the power supply voltage VDD).

The DVFS controller 11_2 may output the control signals CTRL_CLK and CTRL_VDD for adjusting the operating frequency and/or operating voltage, based on a resonance frequency calculated from a frequency response resulting from the dynamic characteristics of the entire power system, which may cause improvements to the performance and/or power consumption of the system 10. The entire power system may include a power management unit, a power delivery network (PDN), and a subblock(s). This will be described in detail below.

Environmental factors of the IP device 11, such as the temperature of the IP device 11 and the humidity thereof, may change depending on runtime. The environmental factors not only affect the operation of the IP device 11 but may also affect a DVFS operation. For example, in the same workload, a target voltage and/or target frequency determined through the DVFS operation may vary depending on the temperature or aging degree of the IP device 11. Therefore, according to some example embodiments, the DVFS controller 11_2 may perform the DVFS operation by considering the environmental factors, which may cause improvements to the performance and/or power consumption of the system 10.

The CMU 12 may generate the clock signal CLK and may adjust the frequency of the clock signal CLK, based on the clock control signal CTRL_CLK. For example, the CMU 12 may include an oscillator that generates the clock signal CLK based on the clock control signal CTRL_CLK. The CMU 12 may include a clock generation device such as a phase locked loop (PLL), a delayed locked loop (DLL), or a crystal. The CMU 12 may also be referred to as a clock generator or a clock generation circuit.

The PMU 13 may generate the power supply voltage VDD and may adjust the magnitude of the power supply voltage VDD, based on the voltage control signal CTRL_VDD. For example, the PMU 13 may include a switching regulator that generates the power supply voltage VDD based on the voltage control signal CTRL_VDD. The PMU 13 may also be referred to as a power management integrated circuit (PMIC).

Although not shown in FIG. 1, the system 10 may include other types of functional blocks, such as an input/output (IO) interface block, a universal serial bus (USB) host block, and a USB slave block (universal serial bus), that communicate with the IP device 11.

Figure 2:
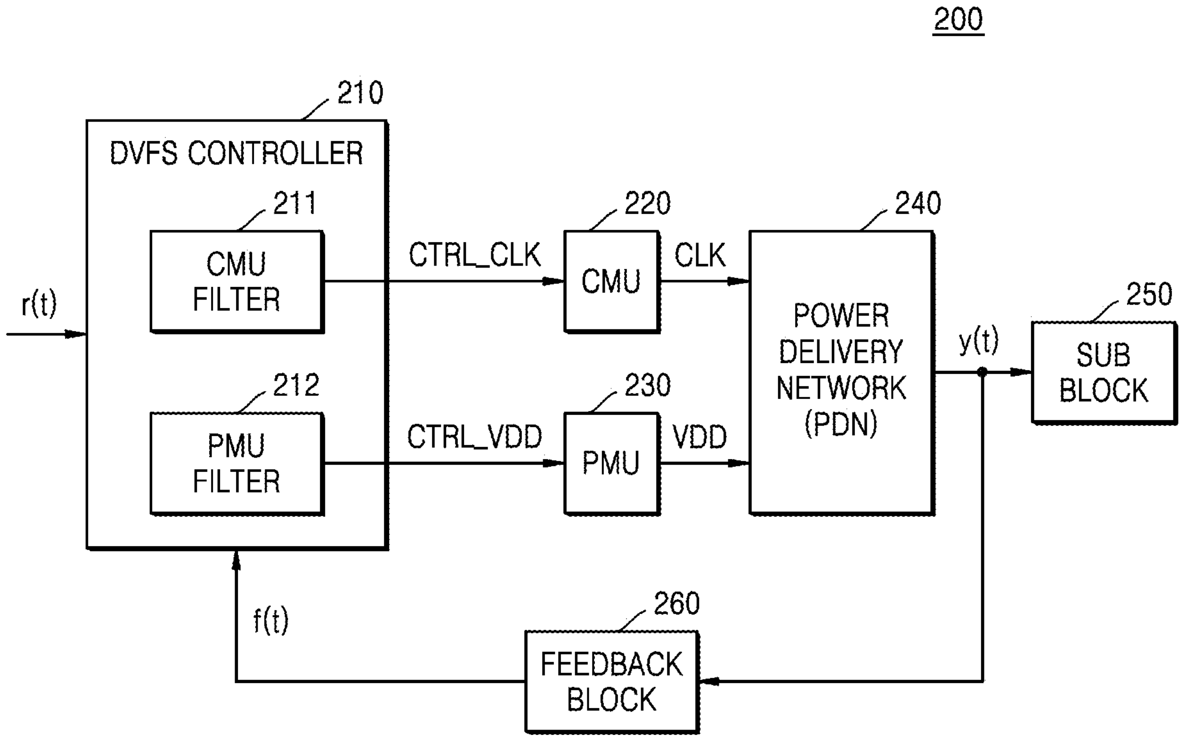
FIG. 2 is a block diagram of a computing system according to some example embodiments.

FIG. 2 is a block diagram of a computing system 200 according to some example embodiments.

Referring to FIG. 2, the computing system 200 may include a DVFS controller 210, a CMU 220, a PMU 230, a PDN 240, a subblock 250 (also referred to herein interchangeably as a subblock circuit), and a feedback block 260. The DVFS controller 210, the CMU 220, the PMU 230, and the subblock 250 of FIG. 2 may correspond to the DVFS controller 11_2, the CMU 12, the PMU 13, and some of the plurality of subblocks 11_1 of FIG. 1. At least one of the DVFS controller 210, the subblock 250, and the feedback block 260 may be implemented using one integrated circuit (IC). FIG. 2 is described with reference to FIG. 1, and descriptions of FIG. 2 that are the same or substantially the same as those of FIG. 1 are omitted.

The DVFS controller 210 may receive a reference signal r(t) and a feedback signal f(t) from the feedback block 260. The reference signal r(t) may be received from an external source, a processing device, memory, or other modules. The reference signal r(t) may be an input signal for analyzing a frequency response resulting from the dynamic characteristics of the entire power system in advance, and outputting optimal control signals CTRL_CLK and CTRL_VDD corresponding to an optimal operating voltage and an optimal operating frequency, based on the analyzed frequency response. The reference signal r(t) may be compared with an output of a current sensor signal and used to generate an error signal. The feedback signal f(t) may be a signal generated by the feedback block 260 by detecting an output voltage y(t) of the entire power system, in order to reflect, for example, changes in an output voltage that is generated during a driving process of the subblock 250. The feedback block 260 may be connected to the DVFS controller 210 to form a closed loop.

The DVFS controller 210 may include a CMU filter 211 and a PMU filter 212. The CMU filter 211 may generate an operating frequency control signal CTRL_CLK that allows the CMU 220 to control an operating frequency of the clock signal CLK, and the PMU filter 212 may generate an operating voltage control signal CTRL_VDD that allows the PMU 230 to control an operating frequency of the power supply voltage VDD. The CMU filter 211 and the PMU filter 212 may respectively receive the reference signal r(t) and the feedback signal f(t).

The CMU filter 211 may receive the reference signal r(t) and the feedback signal f(t) and generate the operating frequency control signal CTRL_CLK for reducing drooping of the output of the entire power system. The PMU filter 212 may receive the reference signal r(t) and the feedback signal f(t) and generate the operating voltage control signal CTRL_VDD for reducing drooping of the output of the entire power system. A method of reducing the drooping of the output of the entire power system is described in detail below. The CMU filter 211 and the PMU filter 212 according to some example embodiments may calculate the difference between the reference signal r(t) and the feedback signal f(t) and may output the control signals CTRL_CLK and CTRL_VDD in which the difference is reflected.

The CMU filter 211 and the PMU filter 212 may be implemented using an analog circuit composed of a combination of analog circuit elements. The CMU filter 211 and the PMU filter 212 according to some example embodiments may each be implemented using at least one circuit filter. The CMU filter 211 and the PMU filter 212 may each be implemented using an analog filter consisting of RLC-based passive elements and may also each be implemented using an analog filter including an active element such as an operational amplifier (Op-Amp). The CMU filter 211 and the PMU filter 212 may each be implemented only by hardware such as an analog circuit without software-based execution by a processor or the like, and thus may achieve low-power execution without the power required to perform software-based calculations.

The CMU 220 may receive the operating frequency control signal CTRL_CLK from the DVFS controller 210 and output the operating frequency CLK corresponding to the operating frequency control signal CTRL_CLK. The PMU 230 may receive the operating voltage control signal CTRL_VDD from the DVFS controller 210 and output the operating voltage VDD corresponding to the operating voltage control signal CTRL_VDD. Descriptions that are the same or substantially the same as those given with reference to FIG. 1 regarding the CMU 220 and the PMU 230 are omitted.

The PDN 240 may be a general term for a transmission system including rails, conductors, etc. for transmitting power to a unit such as subblocks, and may constitute a power system including a PMU and a subblock subject to power transmission. The PDN 240 may receive the operating voltage VDD and the operating frequency CLK and transmit the output voltage y(t) to the subblock 250, based on the operating voltage VDD and the operating frequency CLK. The output voltage y(t) may vary in a voltage value according to an operation of the subblock, resulting in drooping. As described below, in order to achieve a low-power design by reducing drooping of an output voltage, the computing system 200 may analyze a frequency response and perform a DVFS operation based on the frequency response. A power system including the PDN 240 and an analysis method of the frequency response are described in detail below with reference to FIGS. 3 and 4.

Dynamic power consumption P of the subblock 250 may be expressed as Equation 1.

$$P \propto C \cdot V^2 \cdot f \qquad \text{Equation 1}$$

where C may indicate the capacitance of a subblock, V may indicate the magnitude of a power supply voltage applied to the subblock, and f may indicate the frequency of the clock signal applied to the subblock. Therefore, for low-power design, an appropriate design needs to be made considering both a voltage and a frequency. Herein, among the parameters related to power, a parameter excluding the frequency f of the clock signal and the magnitude V of the power supply voltage may be a general term for a power coefficient. For example, the capacitance of the subblock 250 in Equation 1 may be referred to as a power coefficient.

The subblock 250 may have a different circuit structure for each subblock and may thus have different performance for each subblock. That is, the number of instructions that the subblock 250 is able to process per unit time may be different for each subblock. Due to different circuit structures, even when the magnitude of the power supply voltage and the frequency of the clock signal are the same, the power consumed by the subblock 250 may be different. That is, the power coefficients of subblocks may be different.

According to some example embodiments, including the example embodiments shown in FIG. 2, a low-power design may be achieved through implementation of a DVFS controller without a software unit. Additionally, as described below, an effective low-power design may be achieved by reducing or minimizing voltage drooping of the output voltage through a DVFS operation based on an overall frequency response analysis.

Figure 3:
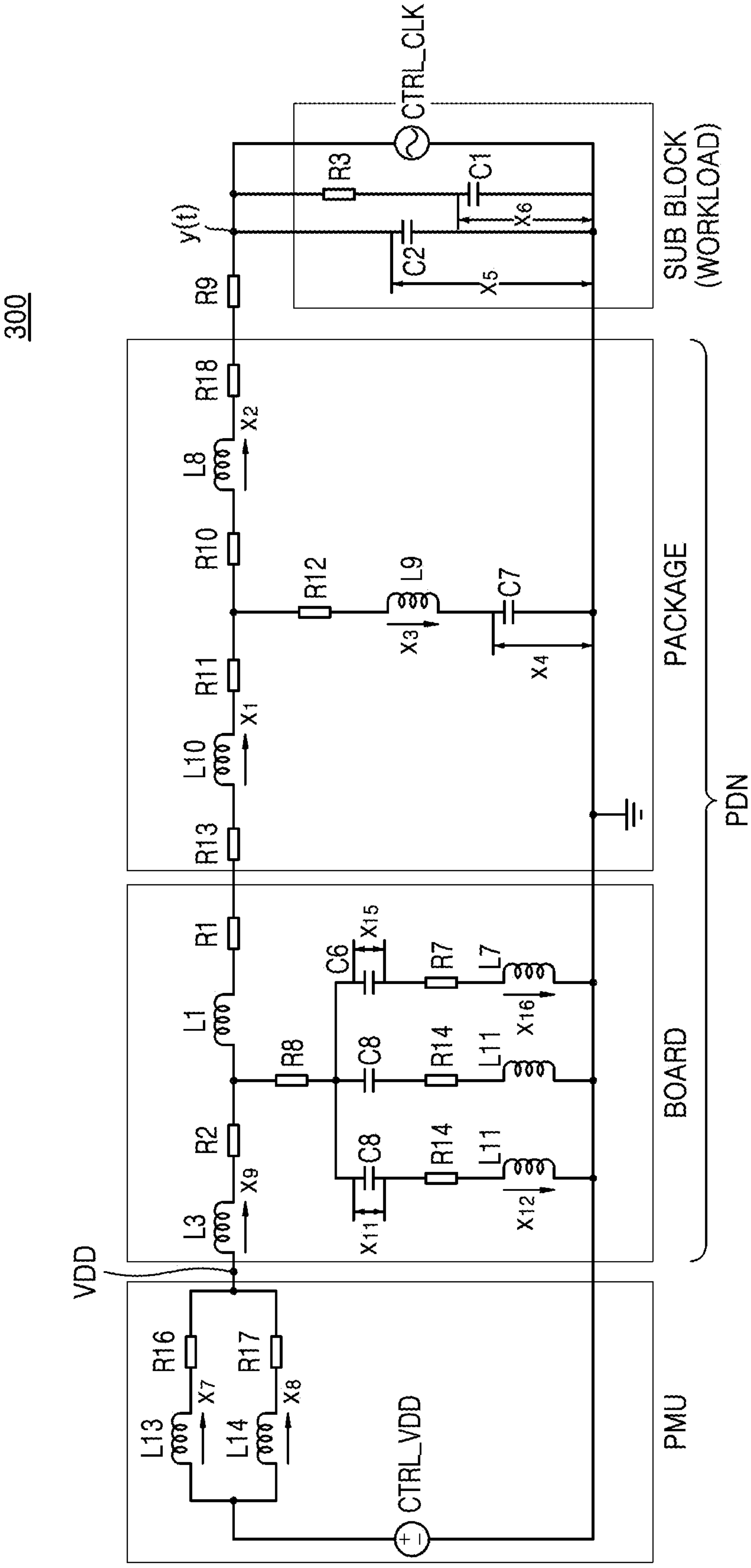
FIG. 3 is a circuit diagram of a computer system according to some example embodiments.

FIG. 3 is a circuit diagram of a power system 300 according to some example embodiments.

In detail, the power system 300 may be formed including a PMU, a subblock, and a PDN, and the PDN may be divided into a board and a package. The PMU, the subblock, and the PDN may be some example embodiments of the PMU, the subblock, and the PDN described above with reference to FIGS. 1 and 2, and descriptions that are the same or substantially the same as those given with reference to FIGS. 1 and 2 are omitted.

The PMU may output the operating voltage VDD based on the received operating voltage control signal CTRL_VDD, and the operating voltage VDD may be transmitted to the subblock through the PDN including the board and the package. The subblock may receive the operating frequency CLK based on the operating frequency control signal CTRL_CLK from the CMU and receive the operating voltage VDD through the PDN to process instructions. The operating voltage VDD generated by the PMU may express, as the output voltage y(t), a voltage transmitted to the subblock through the PDN.

To analyze the power system 300, a response may be analyzed in the time domain. However, verification of disturbance and noise in all cases that may occur in the system may have a low probability, and long time may be taken for the analysis. When the components of the power system 300 of FIG. 3 are analyzed and a circuit diagram based on the components of the power system 300 of FIG. 3 is analyzed, the overall response may be modeled by analyzing a frequency response in the frequency domain, based on a result of the analysis. The circuit diagram shown in FIG. 3 is an equivalent circuit of the power system 300 and may include a plurality of resistors, a plurality of capacitors, and a plurality of inductors. As unknowns for analyzing a circuit, a current passing through an inductor or resistor and a voltage difference applied to a capacitor may be expressed as a plurality of unknowns (indicated by x). To ascertain the output voltage y(t) corresponding to the input of the operating voltage control signal CTRL_VDD and the operating frequency control signal CTRL_CLK (implemented in the unit of current), Kirchhoff's current law and Kirchhoff's voltage law (Kirchhoff's Laws) may be used. Circuit equations may be expressed as a differential equation in the time domain, which may be represented as a set of multiple equations, such as Equation 2 below.

Equation 2

$$x_2 = u_2 + C_2\dot{x}_5 + C_1\dot{x}_6$$

$$L_{13}\dot{x}_7 + R_{16}x_7 = L_{14}\dot{x}_8 + R_{17}x_8$$

$$u_1 = L_{13}\dot{x}_7 + R_{16}x_7 + L_3\dot{x}_9 + R_2x_9 + R_2(2x_{12} + x_{16}) + x_{11} + L_{11}\dot{x}_{12} + R_{14}x_{12}$$

$$x_{11} + L_{11}\dot{x}_{12} + R_{14}x_{12} = x_{15} + L_7\dot{x}_{16} + R_7x_{16}$$

$$R_2(2x_{12} + x_{16}) + x_{11} + L_{11}\dot{x}_{12} + R_{14}x_{12} = (L_1 + L_{10})\dot{x}_1 + (R_1 + R_{13} + R_{11})x_1 + R_{12}x_3 + L_9\dot{x}_3 + x_4$$

$$R_{12}x_3 + L_9\dot{x}_3 + x_4 = (R_9 + R_{10} + R_{18})x_2 + x_5 + L_8\dot{x}_2$$

$$u_1 = L_{13}\dot{x}_7 + R_{16}x_7 + L_3\dot{x}_9 + R_2x_9 + (L_1 + L_{10})\dot{x}_1 + R_{12}x_3 + L_9\dot{x}_3 + x_4$$

$$x_5 = x_6 + R_3C_1\dot{x}_6$$

$$x_{11} = \frac{1}{c_8}x_{12}$$

$$x_{15} = \frac{1}{c_6}x_{16}$$

$$x_1 = x_2 + x_3$$

$$x_9 = x_7 + x_8$$

$$x_9 = x_1 + 2x_{12} + x_{16}$$

In Equation 2, $L_1$, $L_3$, $L_7$, $L_8$, $L_9$, $L_{10}$, $L_{11}$, $L_{13}$, and $L_{14}$ are inductances of the correspondingly labeled inductors of the power system 300 shown in FIGS. 3, $R_1$, $R_2$, $R_3$, $R_7$, $R_9$, $R_{10}$, $R_{11}$, $R_{12}$, $R_{13}$, $R_{14}$, $R_{16}$, $R_{17}$, and $R_{18}$ are resistances of the correspondingly labeled resistors of the power system 300 shown in FIG. 3, $C_1$ to $C_2$ are capacitances of the correspondingly labeled capacitors of the power system 300 shown in FIG. 3, and $c_6$ to $c_8$ are constants. In Equation 2, the current passing through the inductor or resistor and the voltage difference applied to the capacitor may be expressed as a plurality of unknowns (indicated by x), and $u_1$ and $u_2$ represent the operating voltage control signal CTRL_VDD and the operating frequency control signal CTRL_CLK, respectively. It should be noted that the circuit diagram of FIG. 3 and Equation 2 are a circuit diagram of the power system 300 and an equation corresponding thereto, and thus embodiments are not limited to this type of circuit and equation.

A plurality of equations such as Equation 2 above may be transformed to the frequency domain through Laplace Transform, and after conversion, they may be combined as in solving simultaneous equations to obtain a transfer function.

Transfer functions of an output y corresponding to $u_1$ and $u_2$, respectively, may be expressed as $H_1$ and $H_1$, respectively, and a frequency response may be expressed using a Bode plot to represent the transfer function. A frequency response through a Bode plot of the transfer function of the power system 300 is described in detail with reference to FIG. 4.

Figure 4:
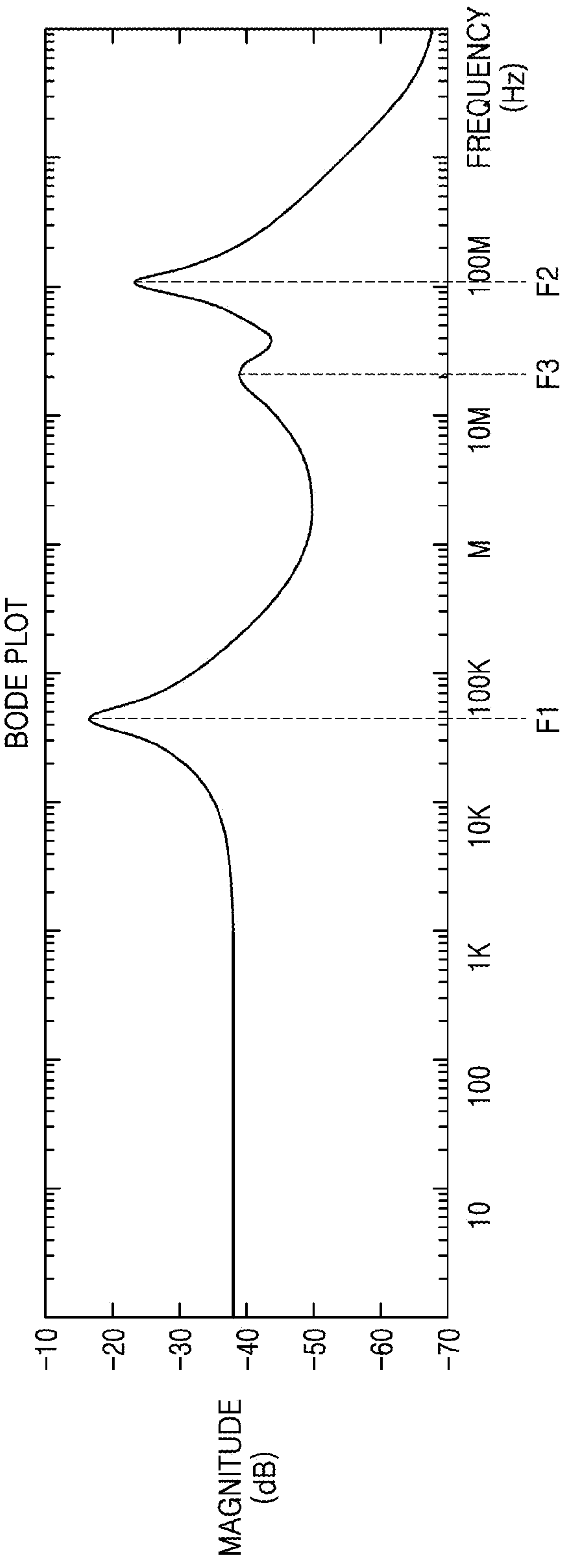
FIG. 4 is a graph showing a frequency response of a power system according to some example embodiments.

FIG. 4 is a graph showing a frequency response of a power system according to some example embodiments.

The power system 300 of FIG. 3 described above may be calculated to the transfer function after circuit analysis to analyze the frequency response through a Bode plot as shown in FIG. 4. The frequency response of FIG. 4 is, for example, a graph, and example embodiments are not limited thereto.

Referring to the Bode plot, the magnitude of the transfer function according to a frequency band may be seen. A major resonance frequency F1, which is a frequency band with the largest magnitude, may be seen. Additionally, a minor resonance frequency F2 and a third resonance F3 may be seen. As for frequency control of DVFS according to a comparative example, restricted frequency adjustment in a frequency band of 100 MHz to several GHz may be achieved. In contrast, a frequency response according to some example embodiments may analyze the overall frequency response of the entire power system. Accordingly, a frequency response in all frequency sections including a section of 100 MHz or less may be analyzed using the Bode plot of FIG. 4, etc. For example, according to the frequency response illustrated in FIG. 4, the major resonance frequency F1 may be formed in a section of about 40 to 50 KHz, the minor resonance frequency F2 may be formed in a section of about 100 MHZ, and the third resonance F3 may be formed in a section of about 20 MHz. Because a DVFS operation according to a comparative example mainly utilizes a frequency in a band of 100 MHz or higher, it may be difficult to perform an operation for identifying and avoiding the major resonance frequency F1 formed in the range of 40 KHz to 50 KHz. On the other hand, according to some example embodiments, because all frequency bands are analyzed, up to the major resonance frequency F1 formed as an example in the range of about 40 to 50 KHz below 100 MHz may be identified. However, this is an example of a frequency response bode plot graph according to the power system 300 of FIG. 3, and the frequencies of the major resonance frequency F1 and the minor resonance frequency F2 may not be limited, and may vary according to components that constitute a power system, such as a PMU and a subblock.

Figure 5A:
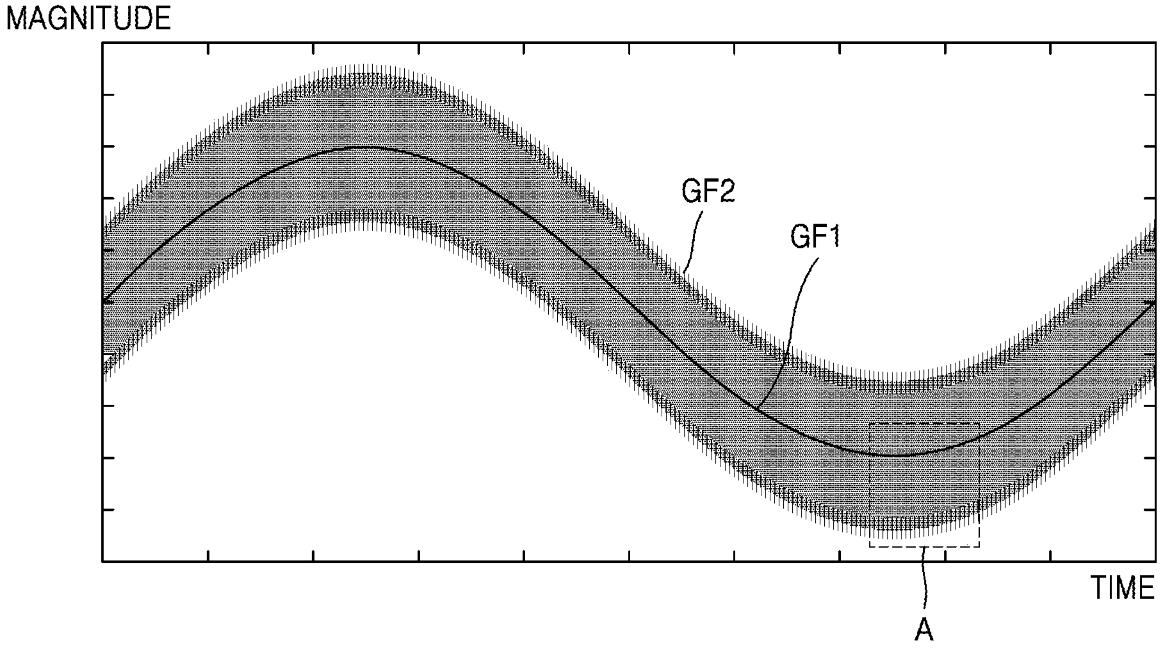
FIGS. 5A and 5B are graphs showing time responses of a power system for each frequency, according to some example embodiments.
Figure 5B:
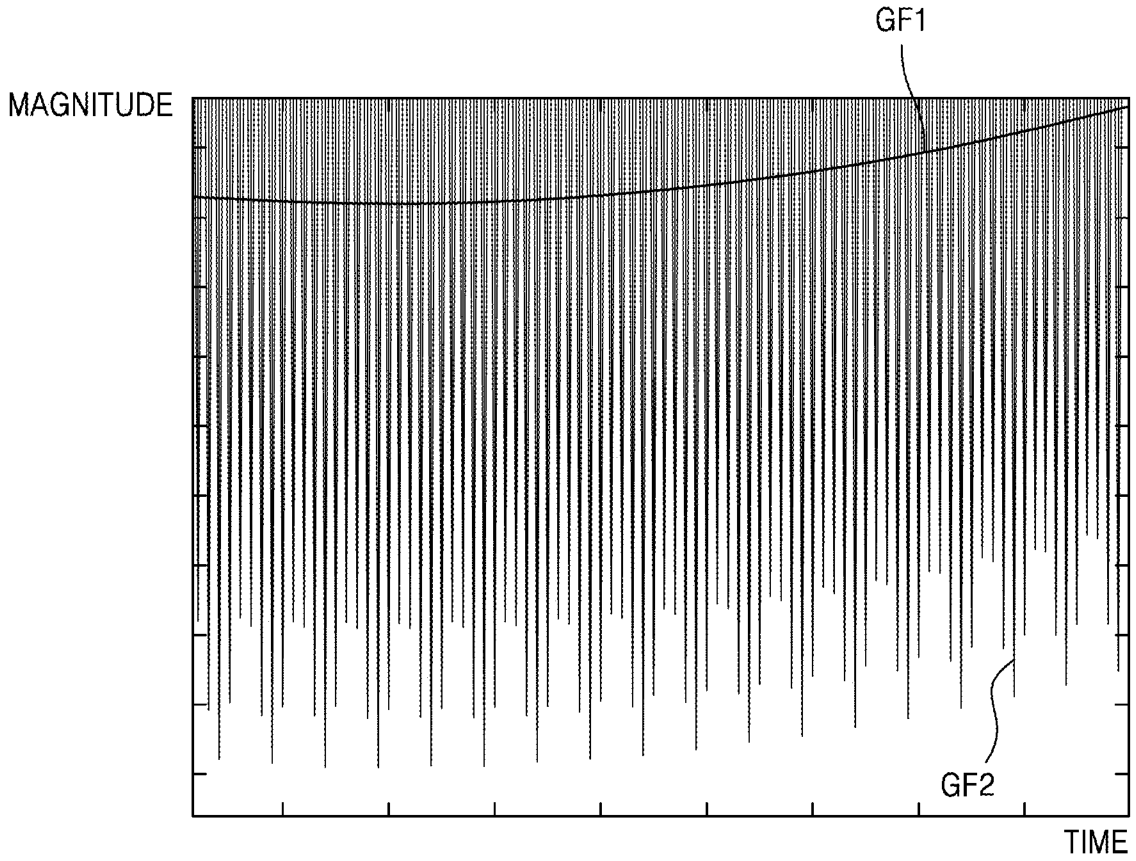
Figure 6:
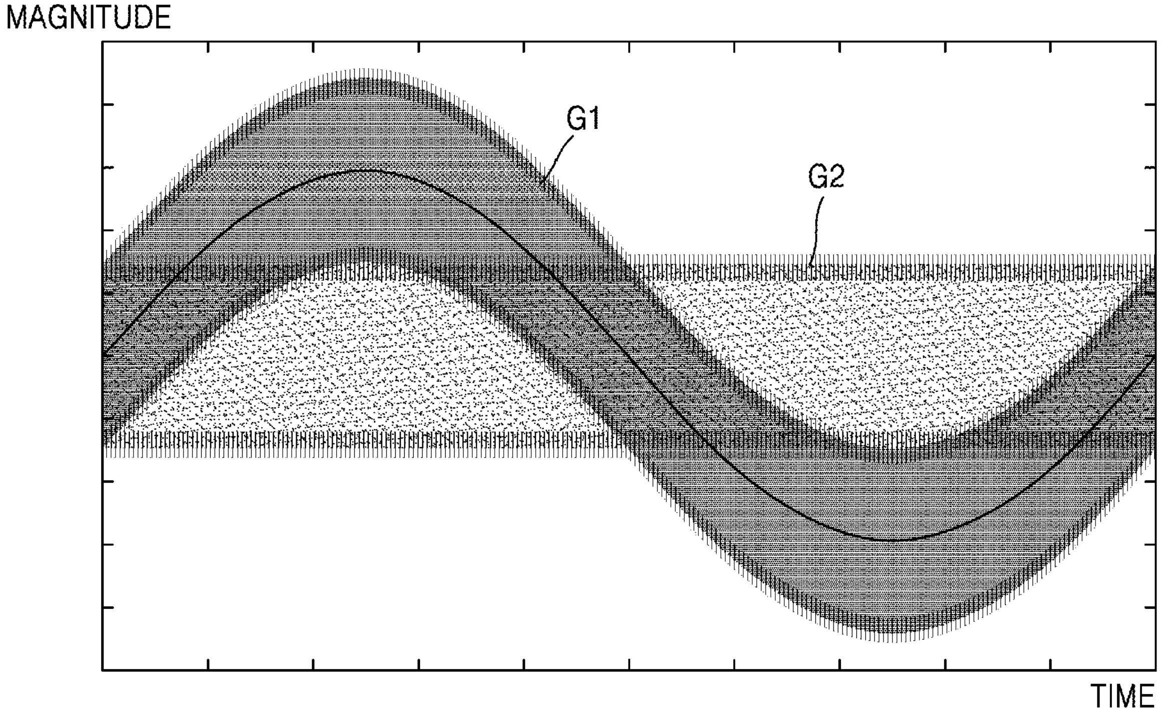
FIG. 6 is a graph showing a time response of a power system according to frequency avoidance, according to some example embodiments.

FIGS. 5A and 5B are graphs showing time responses of a power system for each frequency, according to some example embodiments. FIG. 6 is a graph showing a time response of a power system according to frequency avoidance, according to some example embodiments.

In detail, FIG. 5A is a graph showing a time response of the power system before performing resonance frequency avoidance, FIG. 6 is a graph showing a time response of the power system after performing resonance frequency avoidance, and FIG. 5B is a graph showing a magnification of a portion "A" of the graph of FIG. 5A. The graphs of FIGS. 5A, 5B, and 6 are described with reference to FIGS. 1 through 4, and redundant descriptions are omitted.

Referring to FIGS. 5A and 5B, the value (e.g., magnitude, level, etc.) of an output voltage is shown over time, wherein graph GF1 represents a time response corresponding to the major resonance frequency F1, and graph GF2 may consider both of time responses corresponding to the major resonance frequency F1 and the minor resonance frequency F2. In other words, the graph GF1 represents the output voltage of a subblock that changes in response to major resonance, and the graph GF2 represents the output voltage of a subblock that changes by reflecting both the major resonance and the minor resonance. Unlike the graph GF1, the graph GF2 also reflects the vibration of minor resonance. Thus, it may be seen that the graph GF2 represents an aspect of oscillating up and down relative to the graph GF1. The graph GF2 is a graph corresponding to an illustration that the minor resonance frequency F2 is higher than the major resonance frequency F1 during a comparison between the major resonance band and minor resonance bands illustrated in FIG. 4, and thus embodiments are not limited to this illustration. That is, the minor resonance frequency F2 may appear lower than the major resonance frequency F1.

Referring to FIG. 6, the graph G1 represents a time response corresponding to the major resonance frequency F1 and the minor resonance frequency F2 before performing resonance frequency avoidance, and the graph G2 represents a time response after performing avoidance of the major resonance frequency F1. Actual signals do not have completely periodic characteristics and may be expressed as the sum of multiple square waves by a Fourier series. Square waves corresponding to each frequency may have different waveform amplitudes according to the frequency response of FIG. 4. Among them, the time response considering the major resonance frequency F1 and the minor resonance frequency F2 may appear as the graph G1. In order to reduce an effect of vibration due to resonance, a method of removing or avoiding the frequency of the major resonance or minor resonance band may be performed. In this case, the magnitude of the amplitude appears larger in the major resonance band than in the minor resonance band, so removing or avoiding frequencies in the major resonance band may be important. The time response from which an influence of the major resonance frequency F1 has been removed in the graph G1 may appear as the graph G2. It may be confirmed that the width of vibration may be reduced by removing a component of the major resonance frequency F1, and the minimum value of the output voltage may be increased.

In power design, a condition that the output voltage value is equal to or greater than the lowest threshold to achieve a normal operation of a device may be needed. When a device such as a CPU performs many instructions and thus a workload consumes a large amount of current, voltage droop may occur, and, as a voltage fluctuates, the entire voltage value (e.g., the magnitude of the output voltage y(t)) may be set high in order to ensure that the lowest output voltage value is equal to or greater than the lowest threshold. Referring to Equation 1 defined above, power consumption is proportional to the square of the voltage, and thus a large amount of power may be consumed in a process of setting the voltage value to perform the operation of the device even under the influence of this voltage droop. Therefore, by reducing the oscillation amplitude of the output voltage and increasing the minimum value of the output voltage as described above, a voltage increase required to ensure that the minimum output voltage value is equal to or greater than the minimum threshold may be needed. In other words, by avoiding the frequency of a resonance band, an unnecessary voltage rise may be designed small, and also stability may be secured, and an effective low-power design may be achieved, thereby providing a device (e.g., an integrated circuit, system, device, etc.) which may have improved power consumption efficiency, reduced power consumption, or the like, with reduced risk or prevention of the output voltage to at least one subblock (subblock circuit) thereof falling below a threshold to achieve a normal operation of a device, thereby reducing or preventing system faults due to voltage droop. Thus, the device may have improved operational reliability (e.g., reduced, minimized, or prevented likelihood of the output voltage falling below a threshold to achieve a normal operation of a device), and thus the device may have improved operational reliability (e.g., reduced, minimized, or prevented likelihood of the output voltage falling below a threshold to achieve a normal operation of a device). As a result, the functionality of such device (e.g., an integrated circuit, system, computing system, device, etc.) may have improved functionality based on the device including a dynamic voltage and frequency scaling (DVFS) controller (e.g., 210) configured to control a power management unit (PMU) and a clock management unit (CMU) to control an operating voltage (e.g., VDD to the PDN 240) and an operating frequency (e.g., clock signal CLK to the PDN 240), respectively, based on a resonance frequency calculated from a frequency response resulting from dynamic characteristics of an entire power system including the PMU (230), a PDN (240), and the at least one subblock (250). The value of the minimum threshold may be stored at a memory of a device and may be received or accessed by the DVFS controller 210 from the memory.

A DVFS operation may be achieved considering both the major resonance frequency F1 and the minor resonance frequency F2. Because the vibration amplitude of the frequency band is large in both the major resonance and the minor resonance, the DVFS controller 210 may perform the DVFS operation by avoiding or responding to both the major resonance band and the minor resonance band.

In addition, the DVFS controller 210 may identify the resonance frequency band and perform frequency avoidance to process the resonance frequency band and may control the output voltage to be equal to or greater than the minimum threshold by limitedly increasing the voltage in response to the resonance frequency band. The value of the minimum threshold may be stored at a memory of a device and may be received or accessed by the DVFS controller 210 from the memory. For example, the CMU filter 211 in the DVFS controller 210 may be configured to control the operating frequency CLK to avoid the resonance frequency. That is, the CMU filter 211 may output the operating frequency control signal CTRL_CLK for controlling the operating frequency CLK to avoid the resonance frequency. The CMU filter 211 in the DVFS controller 210 may also be configured to control the operating voltage VDD in response to the resonance frequency. That is, the PMU filter 212 may output the operating voltage control signal CTRL_VDD for controlling the operating voltage VDD to increase, when (e.g., based on a determination, for example at the DVFS controller 210, that) the operating frequency CLK is adjacent to (e.g., within a 10% margin, within a 5% margin, within a 1% margin, etc.) the resonance frequency.

According to some example embodiments, including the above-described example embodiments, an effective low-power design may be achieved by reducing or minimizing voltage drooping of the output voltage through a DVFS operation based on an overall frequency response analysis, thereby providing a device (e.g., an integrated circuit, system, device, etc.) which may have improved power consumption efficiency, reduced power consumption, or the like, with reduced risk or prevention of the output voltage to at least one subblock (subblock circuit) thereof falling below a threshold to achieve a normal operation of a device, thereby reducing or preventing system faults due to voltage droop. Thus, the device may have improved operational reliability (e.g., reduced, minimized, or prevented likelihood of the output voltage falling below a threshold to achieve a normal operation of a device). As a result, the functionality of such device (e.g., an integrated circuit, system, computing system, device, etc.) may have improved functionality based on the device including a dynamic voltage and frequency scaling (DVFS) controller (e.g., 210) configured to control a power management unit (PMU) and a clock management unit (CMU) to control an operating voltage (e.g., VDD to the PDN 240) and an operating frequency (e.g., clock signal CLK to the PDN 240), respectively, based on a resonance frequency calculated from a frequency response resulting from dynamic characteristics of an entire power system including the PMU (230), a PDN (240), and the at least one subblock (250). In addition, a low-power design may be achieved through implementation of a DVFS controller without a software unit.

Figure 7:
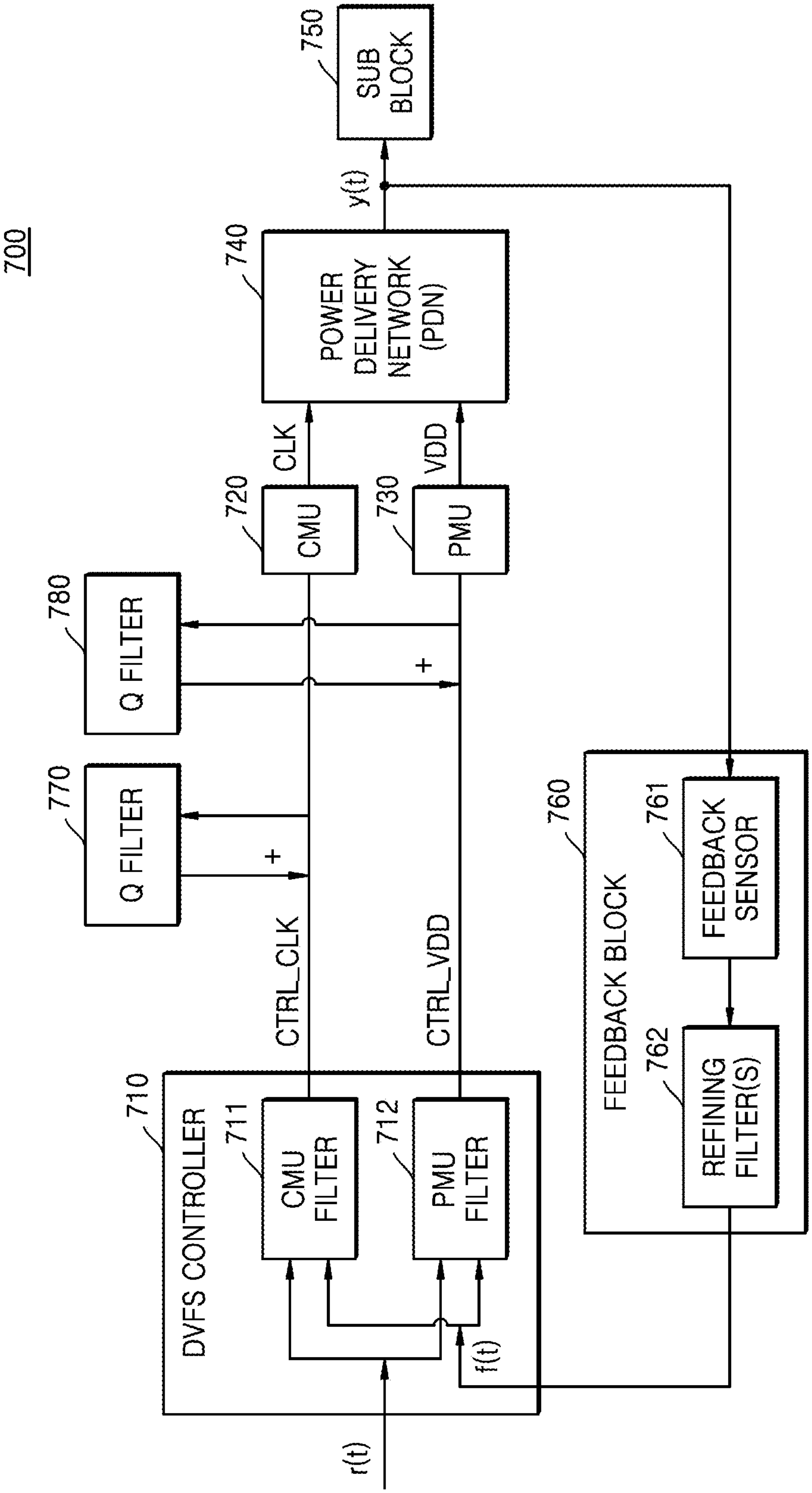
FIG. 7 is a block diagram of a computing system according to some example embodiments.

FIG. 7 is a block diagram of a computing system 700 according to some example embodiments.

Referring to FIG. 7, the computing system 700 may include a DVFS controller 710, a CMU 720, a PMU 730, a PDN 740, a subblock 750 (also referred to herein interchangeably as a subblock circuit), a feedback block 760, and Q filters 770 and 780. The DVFS controller 710, the CMU 720, the PMU 730, the PDN 740, and the subblock 250 of FIG. 7 may correspond to the DVFS controller 210, the CMU 220, the PMU 230, the PDN 240, and the subblock 250 of FIG. 2. At least one of the DVFS controller 710, the subblock 750, the feedback block 760, and the Q filters 770 and 780 may be implemented using one IC. FIG. 7 is described with reference to FIGS. 1 and 2, and redundant descriptions are omitted.

The computing system 700 encompasses some example embodiments of the computing system 200 of FIG. 2, and may further include the Q filters 770 and 780 in addition to the computing system 200 of FIG. 2. The feedback block 760 may include a feedback sensor 761 and a refining filter(s) 762. The feedback sensor 761 may detect the output of the power system (e.g., output voltage y(t)) to generate a sensing signal. The feedback sensor 761 may be any of a variety of sensors, such as a voltage sensor, a current sensor, and a temperature sensor and may include any sensor for converting the output into an appropriate signal. A feedback sensor according to some example embodiments may be configured as a voltage sensor and may generate a sensing signal by detecting an output voltage y(t). The refining filter(s) 762 is a component for reprocessing and filtering the sensing signal as needed. In some cases, the refining filter(s) 762 may be omitted. The refining filter(s) 762 may receive the sensing signal, reprocess (refinement) the sensing signal, and generate a feedback signal. The refining filter(s) 762 may be configured as a filter such as a low pass filter (LPF), a high pass filter (HPF), a band pass filter (BPF), an anti-aliasing filter, or may be configured as a combination of multiple filters. Finally, the feedback signal generated through the feedback block 760 may be transmitted to the DVFS controller 710 and may form a closed loop.

The Q filters 770 and 780 may remove or may reprocess or filter noise from the operating frequency control signal CTRL_CLK, which is an output of the CMU filter 711, and the operating voltage control signal CTRL_VDD, which is an output of the PMU filter 712. Through filtering or reprocessing processes such as noise removal, unnecessary data may be removed and a more effective DVFS operation may be performed.

Figure 8:
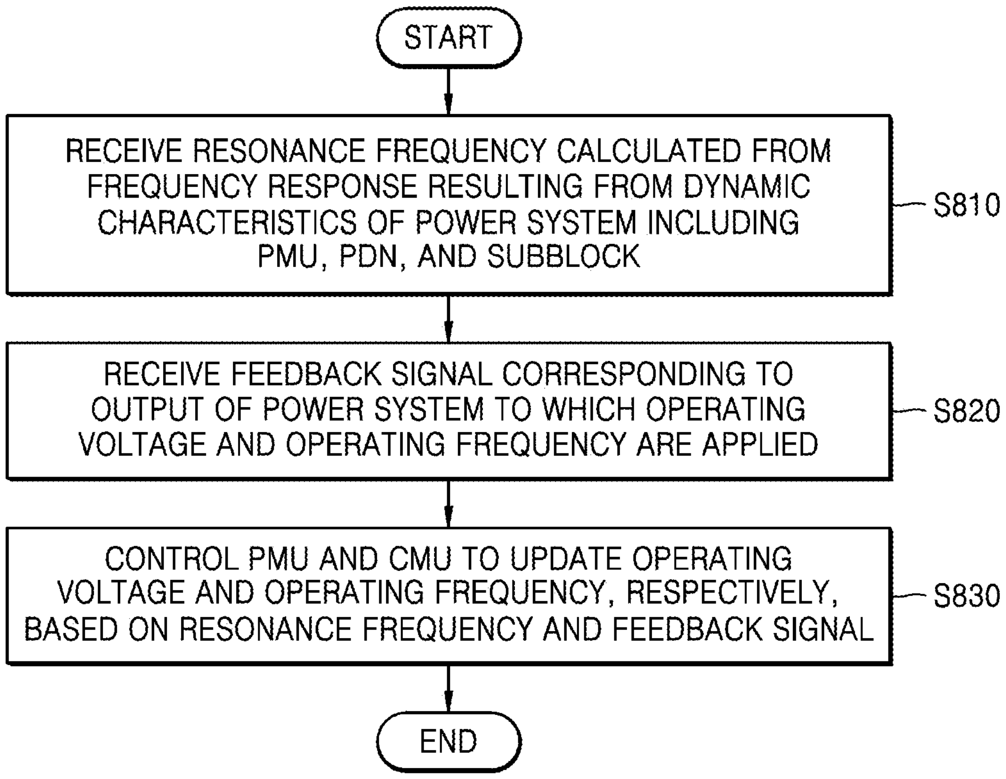
FIG. 8 is a flowchart of a method of operating a Dynamic Voltage and Frequency Scaling (DVFS) controller, according to some example embodiments.

FIG. 8 is a flowchart of a method of operating a DVFS controller, according to some example embodiments. The DVFS controller may be any of the DVFS controllers according to any of the example embodiments.

Referring to FIG. 8, the DVFS controller 210 may operate by performing a plurality of operations S810 through S830. FIG. 8 is described with reference to the above-described embodiments, and descriptions of FIG. 8 that are the same or substantially the same as those of the above-described example embodiments are omitted.

In operation S810, the DVFS controller 210 may receive (e.g., may determine, may receive a signal and/or data indicating, etc.) a resonance frequency calculated from a frequency response resulting from the dynamic characteristics of a power system. The power system may include a PMU, a PDN, and a subblock. The DVFS controller 210 may receive a resonance frequency calculated from an external source, a processor, a memory, or any other unit. The received resonance frequency may include a major resonance frequency and a minor resonance frequency. The DVFS controller 210 may receive the resonance frequency based on transmitting a request for information indicating the resonance frequency from an external source (e.g., the memory device 2300 shown in FIG. 9) to cause the external source to provide the information to the DVFS controller 210.

In operation S820, the DVFS controller 210 may receive a feedback signal (e.g., f(t)) corresponding to the output (e.g., output voltage y(t)) of the power system to which the operating voltage and the operating frequency are applied. For example, the DVFS controller 210 may receive a feedback signal f(t) from a feedback block 260 that has sensed the output voltage y(t). The feedback block may include only a feedback sensor, or may include an additional refining filter. A description thereof that is the same as given above with reference to FIGS. 2 and 7 will not be repeated herein.

In operation S830, the DVFS controller 210 may control the PMU and the CMU to update the operating voltage and the operating frequency, respectively, based on the resonance frequency and the feedback signal. In detail, the DVFS controller 210 may transmit the operating voltage control signal CTRL_VDD to the PMU to cause the PMU to update the operating voltage VDD and may transmit the operating frequency control signal CTRL_CLK to the CMU to cause the CMU to update the operating frequency CLK. The DVFS controller 210 according to some example embodiments may output (transmit) the operating voltage control signal CTRL_VDD through the CMU filter 211 and may output (transmit) the operating frequency control signal CTRL_CLK through the PMU filter 212.

According to some example embodiments, including the above-described example embodiments, an effective low-power design may be achieved by minimizing voltage drooping of the output voltage through a DVFS operation based on an overall frequency response analysis. Thus, a device implementing the method as shown in FIG. 8 (e.g., an integrated circuit, system, device, etc. according to any of the example embodiments) may have improved power consumption efficiency, reduced power consumption, or the like, without compromising the output voltage to at least one subblock (subblock circuit) thereof falling below a threshold to achieve a normal operation of the device. As a result, the functionality of such device (e.g., an integrated circuit, system, computing system, device, etc.) may have improved functionality based on the device including a dynamic voltage and frequency scaling (DVFS) controller (e.g., 210) configured to control a power management unit (PMU) and a clock management unit (CMU) to control an operating voltage (e.g., VDD to the PDN 240) and an operating frequency (e.g., clock signal CLK to the PDN 240), respectively, based on a resonance frequency calculated from a frequency response resulting from dynamic characteristics of an entire power system including the PMU (230), a PDN (240), and the at least one subblock (250). In addition, a low-power design may be achieved through implementation of a DVFS controller without a software unit.

Figure 9:
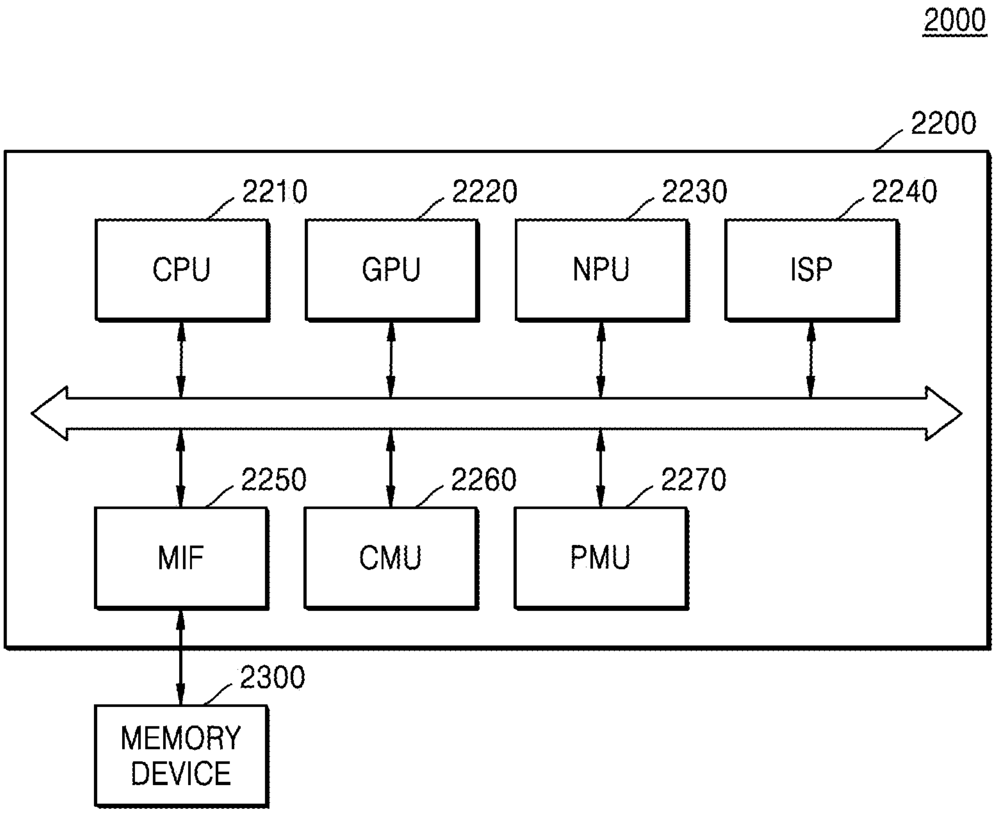
FIG. 9 is a block diagram of a system according to some example embodiments.

FIG. 9 is a block diagram of a system 2000 according to some example embodiments.

Referring to FIG. 9, the system 2000 may be implemented using a handheld device such as a mobile telephone, a smartphone, a tablet computer, a PDA, an EDA, a digital still camera, a digital video camera, a PMP, a personal navigation device or PND, a handheld game console, or an e-book.

The system 2000 may include a SoC 2200 and a memory device 2300. The SoC 2200 may include a CPU 2210, a GPU 2220, an NPU 2230, an ISP 2240, a memory interface (MIF) 2250, a clock management unit (CMU) 2260, a power management unit (PMU) 2270. The CPU 2210, the GPU 2220, the NPU 2230, and the ISP 2240 may be referred to as master IP devices, and the MIF 2250 may be referred to as a slave IP device. At least one of the CPU 2210, the GPU 2220, the NPU 2230, the ISP 2240, and the MIF 2250 may be an implementation example of the IP device described above with reference to FIGS. 1 through 8. Accordingly, at least one of the CPU 2210, the GPU 2220, the NPU 2230, the ISP 2240, and the MIF 2250 may include a plurality of subblocks and may include a DVFS controller that performs a DVFS operation based on the power consumed by the plurality of subblocks. The DVFS controller included in the CPU 2210, the GPU 2220, the NPU 2230, the ISP 2240, and the MIF 2250 may control the CMU 2260 or the PMU 2270, and the CPU 2210, the GPU 2220, the NPU 2230, the ISP 2240, and the MIF 2250 may process instructions by receiving the clock signal CLK from the CMU 2260 and receiving a power supply voltage from the PMU 2270.

The CPU 2210 may process or execute commands and/or data stored in the memory device 2300, in response to a clock signal generated by the CMU 2260.

The GPU 2220 may obtain image data stored in the memory device 2300, in response to a clock signal generated by the CMU 2260. The GPU 2220 may generate data for an image output on a display (not shown) from the image data provided by the MIF 2250 and may encode the image data.

The NPU 2230 may refer to any device that executes a machine learning model. The NPU 2230 may be a hardware block designed to execute a machine learning model. The machine learning model may be based on an artificial neural network, a decision tree, a support vector machine, a regression analysis, a Bayesian network, a genetic algorithm, etc. Non-limiting examples of the artificial neural network may include a convolution neural network (CNN), a region based convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network.

The ISP 2240 may perform a signal processing operation on raw data received from an image sensor (not shown) located outside the SoC 2200 and may generate digital data with improved image quality.

The MIF 2250 may provide an interface to the memory device 2300 located outside the SoC 2200. The memory device 2300 may be DRAM, phase-change random access memory (PRAM), resistive random access memory (ReRAM), or flash memory.

The CMU 2260 may generate the clock signal and provide the clock signal to the components of the SoC 2200. The CMU 2260 may include a clock generation device such as a PLL, DLL, or a crystal. The PMU 2270 may convert external power to internal power and supply the internal power to the components of the SoC 2200.

Figure 10:
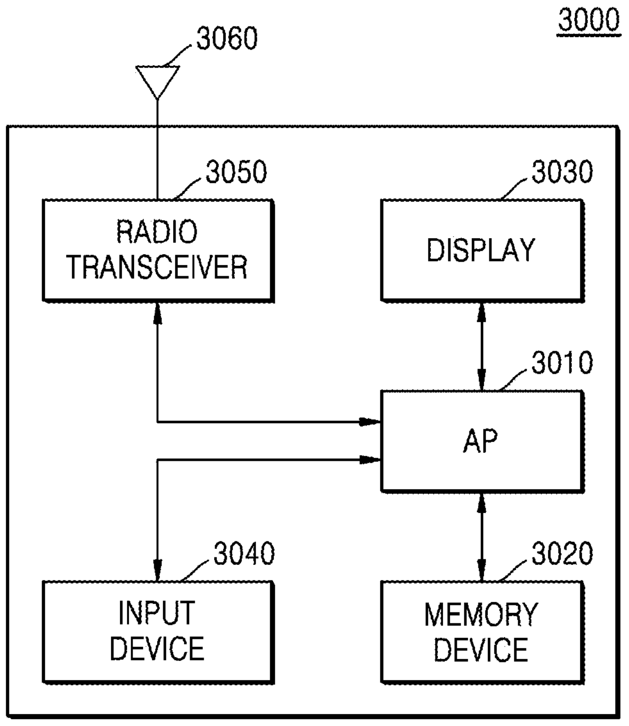
FIG. 10 is a block diagram of a communication device including an application processor (AP), according to some example embodiments.

FIG. 10 is a block diagram of a communication device 3000 including an application processor (AP) 3010, according to some example embodiments.

Referring to FIG. 10, the communication device 3000 may include the AP 3010, a memory device 3020, a display 3030, an input device 3040, and a radio transceiver 3050. The AP 3010 may be an implementation example of at least one of the IP devices described above with reference to FIGS. 1 through 9.

The radio transceiver 3050 may transmit or receive a radio signal via an antenna 3060. For example, the radio transceiver 3050 may change a radio signal received through the antenna 3060 to a signal processable by the AP 3010.

Accordingly, the AP 3010 may process the signal output by the radio transceiver 3050 and transmit the processed signal to the display 3030. The radio transceiver 3050 may change the signal output by the AP 3010 to a radio signal and output the radio signal to an external device through the antenna 3060.

The input device 3040 is capable of inputting a control signal for controlling an operation of the AP 3010 or data to be processed by the AP 3010, and may be implemented as a pointing device (such as, a touch pad and a computer mouse), a keypad, or a keyboard.

According to some example embodiments, the AP 3010 may include a plurality of subblocks and a DVFS controller for controlling operating conditions of the plurality of subblocks. As described above with reference to FIGS. 1 through 9, the DVFS controller may reduce voltage droop of the output voltage by performing a DVFS operation based on overall frequency response analysis.

Although not shown in FIG. 10, the communication device 3000 may further include a clock management unit that provides a clock signal and a power management unit that provides a power voltage, in addition to the various components provided in the communication device 3000. The clock management unit may output a clock signal with a frequency adjusted under the control by the DVFS controller, and the power management unit may output a power supply voltage with a magnitude adjusted under the control by the DVFS controller.

As described herein, any devices, systems, modules, portions, units, controllers, circuits, and/or portions thereof according to any of the example embodiments, and/or any portions thereof (including, without limitation, the system 10, the IP device 11, the CMU 12, the PMU 13, the subblocks 11_1, the DVFS controller 11_2, the computing system 200, the DVFS controller 210, the CMU 220, the PMU 230, the PDN 240, the subblock 250, the feedback block 260, the CMU filter 211, the PMU filter 212, the computing system 700, the DVFS controller 710, the CMU 720, the PMU 730, the PDN 740, the subblock 750, the feedback block 760, Q filter 770, Q filter 780, CMU filter 711, PMU filter 712, feedback sensor 761, refining filter(s) 762, the system 2000, the SoC 2200, the memory device 2300, the CPU 2210, the GPU 2220, the NPU 2230, the ISP 2240, the memory interface (MIF) 2250, the clock management unit (CMU) 2260, the power management unit (PMU) 2270, the communication device 3000, the AP 3010, the memory device 3020, the display 3030, the input device 3040, the radio transceiver 3050, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, portions, units, controllers, circuits, and/or portions thereof according to any of the example embodiments.

While the inventive concepts have been particularly shown and described with reference to embodiments thereof, it will be understood that various changes in form and details may be made therein without departing from the spirit and scope of the following claims.

What is claimed is:

1. An integrated circuit, comprising:

at least one subblock circuit configured to process an instruction; and a dynamic voltage and frequency scaling (DVFS) controller configured to control a power management unit (PMU) and a clock management unit (CMU) to control an operating voltage and an operating frequency, respectively, based on a resonance frequency calculated from a frequency response resulting from dynamic characteristics of an entire power system, the entire power system including the PMU, a power delivery network (PDN), and the at least one subblock circuit, wherein the DVFS controller is configured to perform a closed-loop control operation of the PMU and CMU to control the operating voltage and the operating frequency, respectively, based on the resonance frequency.

2. The integrated circuit of claim 1, further comprising a feedback block circuit configured to detect an output of the entire power system and transmit a feedback signal to the DVFS controller.

3. The integrated circuit of claim 2, wherein the feedback block circuit comprises:

a feedback sensor configured to detect the output of the entire power system and generate a first signal; and a refining filter configured to generate a second signal based on reprocessing the first signal and transmit the second signal to the DVFS controller.

4. The integrated circuit of claim 1, wherein the DVFS controller is configured to control the PMU and the CMU to control the operating voltage and the operating frequency, respectively, based on a major resonance frequency and a minor resonance frequency both calculated from the frequency response.

5. The integrated circuit of claim 1, wherein the DVFS controller comprises:

a PMU driving circuit configured to output a voltage control signal to the PMU; and a CMU driving circuit configured to output a frequency control signal to the CMU.

6. The integrated circuit of claim 5, wherein the CMU driving circuit is configured to transmit the frequency control signal that controls the operating frequency to avoid the resonance frequency.

7. The integrated circuit of claim 5, wherein the PMU driving circuit is configured to transmit the voltage control signal that controls the operating voltage to increase, based on a determination that the operating frequency is adjacent to the resonance frequency.

8. The integrated circuit of claim 5, further comprising:

a first Q-filter configured to process noise of the voltage control signal; and a second Q-filter configured to process noise of the frequency control signal.

9. The integrated circuit of claim 1, wherein the DVFS controller is an analog circuit including a combination of analog circuit elements.

10. A method of operating a dynamic voltage and frequency scaling (DVFS) controller for controlling an operating voltage and an operating frequency of an integrated circuit, the method comprising:

receiving a resonance frequency calculated from a frequency response resulting from dynamic characteristics of an entire power system, the entire power system including a power management unit (PMU), a power delivery network (PDN), and a subblock circuit;

receiving a feedback signal corresponding to an output of the entire power system to which the operating voltage and the operating frequency are applied; and controlling the PMU and a clock management unit (CMU) to update the operating voltage and the operating frequency, respectively, based on the resonance frequency and the feedback signal, wherein the DVFS controller is configured to perform a closed-loop control operation of the PMU and CMU to control the operating voltage and the operating frequency, respectively, based on the resonance frequency.

11. The method of claim 10, wherein the resonance frequency includes a major resonance frequency and a minor resonance frequency.

12. The method of claim 10, wherein the controlling includes outputting a frequency control signal that controls the operating frequency to avoid the resonance frequency.

13. The method of claim 10, wherein the controlling includes outputting a voltage control signal that controls the operating voltage, based on a determination that the operating frequency is adjacent to the resonance frequency.

14. The method of claim 10, wherein the DVFS controller is an analog circuit including a combination of analog circuit elements.

15. A Dynamic Voltage and Frequency Scaling (DVFS) controller, comprising:

a power management unit (PMU) driving circuit configured to output a voltage control signal to a PMU; and a clock management unit (CMU) driving circuit configured to output a frequency control signal to a CMU, wherein the DVFS controller is configured to allow the PMU and the CMU to control an operating voltage and an operating frequency, respectively, based on a resonance frequency calculated from a frequency response resulting from dynamic characteristics of an entire power system including the PMU, a power delivery network (PDN), and a subblock circuit configured to process an instruction, wherein the DVFS controller is configured to perform a closed-loop control operation of the PMU and CMU to control the operating voltage and the operating frequency, respectively, based on the resonance frequency.

16. The DVFS controller of claim 15, wherein a feedback signal is received from a feedback block circuit that detects an output of the entire power system.

17. The DVFS controller of claim 15, wherein the DVFS controller is configured to allow the PMU and the CMU to control the operating voltage and the operating frequency, respectively, based on a major resonance frequency and a minor resonance frequency both calculated from the frequency response.

18. The DVFS controller of claim 15, wherein the CMU driving circuit is configured to transmit the frequency control signal that controls the operating frequency to avoid the resonance frequency.

19. The DVFS controller of claim 15, wherein the PMU driving circuit is configured to transmit the voltage control signal that controls the operating voltage to increase, based on a determination that the operating frequency is adjacent to the resonance frequency.

20. The DVFS controller of claim 15, wherein the DVFS controller is an analog circuit including a combination of analog circuit elements.

* * * * *